(12) United States Patent
Ota et al.

(10) Patent No.: US 11,103,945 B2
(45) Date of Patent: Aug. 31, 2021

(54) INTEGRATED IMPELLER MANUFACTURING METHOD

(71) Applicant: HODEN SEIMITSU KAKO KENKYUSHO CO., LTD., Atsugi (JP)

(72) Inventors: Toshiaki Ota, Chiba (JP); Isao Watanabe, Chiba (JP); Takanori Iwata, Chiba (JP)

(73) Assignee: HODEN SEIMITSU KAKO KENKYUSHO CO., LTD., Atsugi (JP)

( * ) Notice: Subject to any disclaimer, the term of this patent is extended or adjusted under 35 U.S.C. 154(b) by 409 days.

(21) Appl. No.: 16/214,905

(22) Filed: Dec. 10, 2018

(65) Prior Publication Data

US 2019/0105722 A1 Apr. 11, 2019

Related U.S. Application Data

(63) Continuation of application No. PCT/JP2017/018219, filed on May 15, 2017.

(30) Foreign Application Priority Data

Jul. 22, 2016 (JP) .............................. JP2016-144123

(51) Int. Cl.
*B23H 9/10* (2006.01)
*F04D 29/28* (2006.01)
(Continued)

(52) U.S. Cl.
CPC ............. *B23H 9/10* (2013.01); *F04D 29/023* (2013.01); *F04D 29/284* (2013.01); *B23H 1/04* (2013.01);
(Continued)

(58) Field of Classification Search
CPC ....... B32H 1/04; B32H 9/10; F05B 2240/301; F05B 2230/12; F04D 29/284; B23H 1/04; B23H 9/10
See application file for complete search history.

(56) References Cited

U.S. PATENT DOCUMENTS 5,354,961 A 10/1994 Diot et al.
6,676,826 B2 1/2004 Battistini et al.
(Continued)

FOREIGN PATENT DOCUMENTS

CH 700591 B1 9/2010
JP 07051948 A * 2/1995
(Continued)

OTHER PUBLICATIONS

Machine translation of Japan Paten document 07051948A, Mar. 2021.*
(Continued)

*Primary Examiner* — Geoffrey S Evans
(74) *Attorney, Agent, or Firm* — Sughrue Mion, PLLC

(57) ABSTRACT

A method of manufacturing an integrated impeller has a first shroud forming a bottom portion, a second shroud forming a lid portion, a hub formed at the center portion of the first shroud, and blades that section a flow path which is formed between the first shroud and the second shroud and through which a fluid flows. This method includes forming a flow path on the inner circumferential side of the impeller; and forming a flow path on the outer circumferential side of the impeller. The step of forming the flow path on the outer circumferential side of the impeller has the steps of: while rotating the linear electrode having a tip-end part and a base-end part about a longitudinal direction axis thereof, applying electric discharge machining to the first shroud;
(Continued)

applying electric discharge machining to the second shroud; and applying electric discharge machining to the blade.

9 Claims, 20 Drawing Sheets

(51) Int. Cl.
  *F04D 29/02* (2006.01)
  *B23H 1/04* (2006.01)
(52) U.S. Cl.
  CPC ... *F05B 2230/102* (2013.01); *F05B 2240/301* (2013.01); *F05D 2250/621* (2013.01); *F05D 2300/516* (2013.01)

(56) References Cited

U.S. PATENT DOCUMENTS

| | | |
|---|---|---|
| 8,581,136 B2 | 11/2013 | Kishimoto et al. |
| 2002/0062561 A1 | 5/2002 | Battistini et al. |
| 2004/0093727 A1* | 5/2004 | Mola ............... F04D 29/284 29/888.024 |
| 2011/0108526 A1* | 5/2011 | Kishimoto ............... B23H 9/00 219/69.17 |
| 2012/0240386 A1 | 9/2012 | Cantelli et al. |

FOREIGN PATENT DOCUMENTS

| | | |
|---|---|---|
| JP | 2002-235694 A | 8/2002 |
| JP | 2004-351579 A | 12/2004 |
| JP | 2005-177880 A | 7/2005 |
| JP | 2010-089190 A | 4/2010 |
| JP | 2010-125541 A | 6/2010 |
| JP | 2012-187660 A | 10/2012 |

OTHER PUBLICATIONS

International Search Report for PCT/JP2017/018219 dated Jul. 11, 2017 [PCT/ISA/210].
Extended European Search Report dated Feb. 24, 2020, from the European Patent Office in European Application No. 17830678.3.

\* cited by examiner

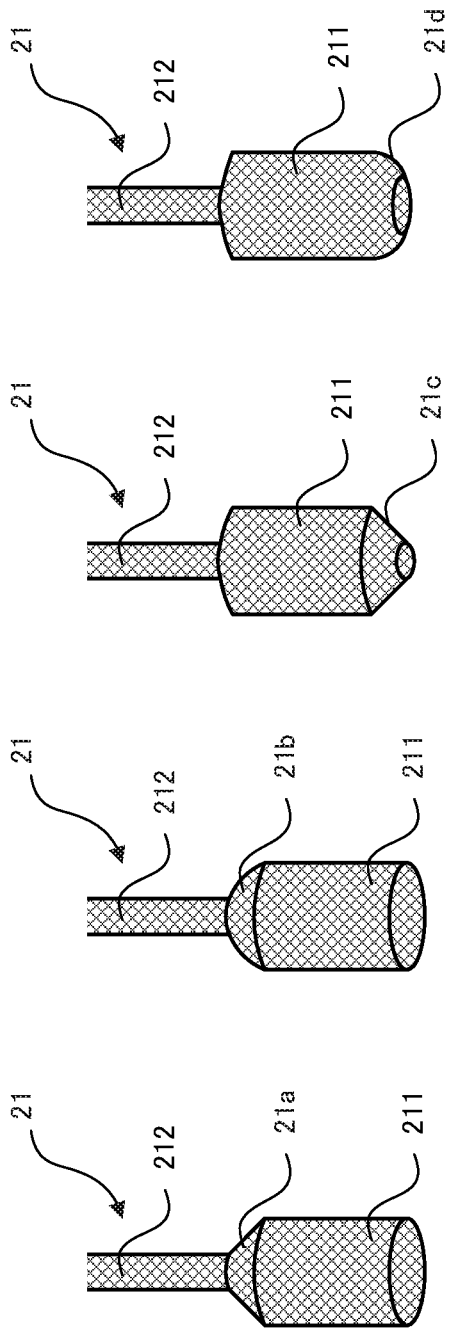
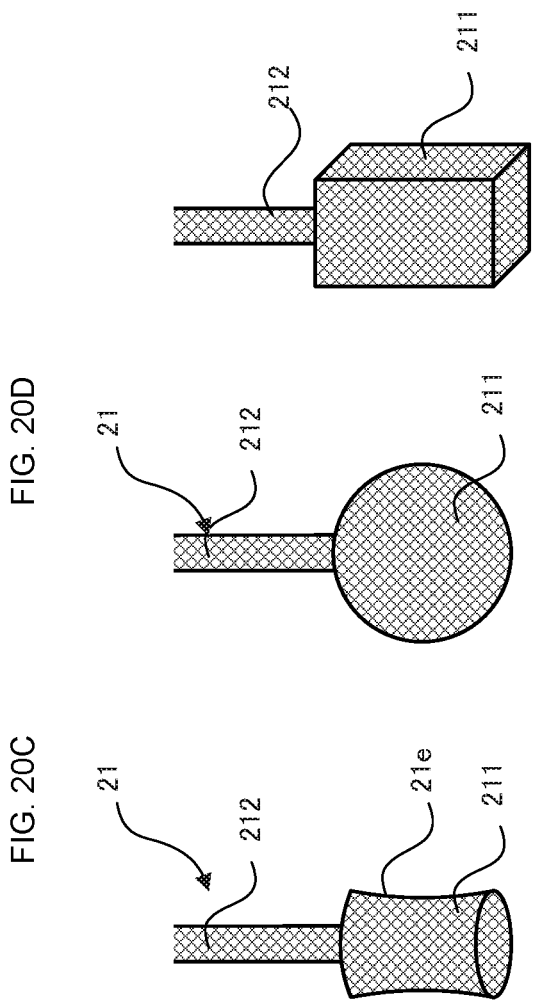
FIG. 20A
FIG. 20B
FIG. 20C
FIG. 20D
FIG. 20E
FIG. 20F
FIG. 20G

INTEGRATED IMPELLER MANUFACTURING METHOD

CROSS-REFERENCE TO RELATED APPLICATIONS

This application is a continuation claiming priority on the basis of Japan Patent Application No. 2016-144123 applied in Japan on Jul. 22, 2016 and based on PCT/JP2017/018219 filed on May 15, 2017. The contents of both the PCT application and the Japan Application are incorporated herein by reference.

BACKGROUND OF THE INVENTION AND RELATED ART STATEMENT

The present invention relates to a method of manufacturing an integrated impeller used in a centrifugal compressor, etc.

In general, an impeller used in a centrifugal compressor includes a hub attached to a rotary shaft, a shroud disposed outward of the hub so as to be spaced therefrom, and a plurality of blades connecting the hub and the shroud. A part surrounded by the side surface of each blade, the stream surface of the hub and the stream surface of the shroud serves as a flow path for compressing gas, etc.

The flow path of such an impeller used in a centrifugal compressor has a complicated shape curved axially and radially. Thus, in general, the blades and shroud are fixed to a disk-shaped body part by fillet welding or groove welding. Alternatively, the shroud is welded to an integrated structure of the body part and blades obtained through integral machining.

However, fixing by the welding may easily cause a welding defect and may easily cause deformation due to local temperature rise in the welded part. Further, there is an increasing trend that the impeller treats corrosive gas and, in this case, the welded part is early corroded. Furthermore, the use of materials having high corrosion resistance, such as Inconel, for the impeller is becoming popular, and some of such materials are not suitable for welding, thus limiting the materials that can be used for the impeller.

Under such circumstances, there is proposed a method of accurately manufacturing an integrated impeller without the use of welding, but using electric discharge machining (see JP 2002-235694 A and JP 2010-089190 A).

The electric discharge machining method described in JP 2002-235694 A relates to a centrifugal compressor rotor, and an arc-shaped cavity serving as a flow path is formed in a disk by electroerosion using an electrode having substantially the same shape as the cavity.

Further, JP 2010-089190 A proposes a method capable of accurately forming a flow path in a more efficient manner by: forming the flow path from both the inner and outer circumferential sides; and by using electric discharge machining using an electrode having a shape corresponding to the curved surface of a blade forming the flow path in forming the flow path from the outer circumferential side and making the curved shape of the electrode and the curved shape of the blade forming the flow path satisfy a certain inequality.

SUMMARY OF THE INVENTION

An integrated impeller manufacturing method according to the present invention is a method of manufacturing an integrated impeller having a first shroud forming the bottom portion thereof, a second shroud forming the lid portion thereof, a hub formed at the center of the first shroud, and blades that section flow paths which are formed between the first shroud and the second shroud and through which fluid flows. The method includes the steps of: forming a flow path on the inner circumferential side of the impeller; and forming a flow path on the outer circumferential side of the impeller. The step of forming the flow path on the outer circumferential side of the impeller includes the steps of: while rotating a linear electrode having a tip-end part and a base-end part about a longitudinal direction axis thereof, applying electric discharge machining to the first shroud; applying electric discharge machining to the second shroud; and applying electric discharge machining to the blade.

BRIEF DESCRIPTION OF DRAWINGS

FIGS. 20A to 20G illustrate other examples of a tip-end part of the linear electrode used in machining the integrated impeller according to the present embodiment.

DESCRIPTION OF EMBODIMENTS

Figure 1:
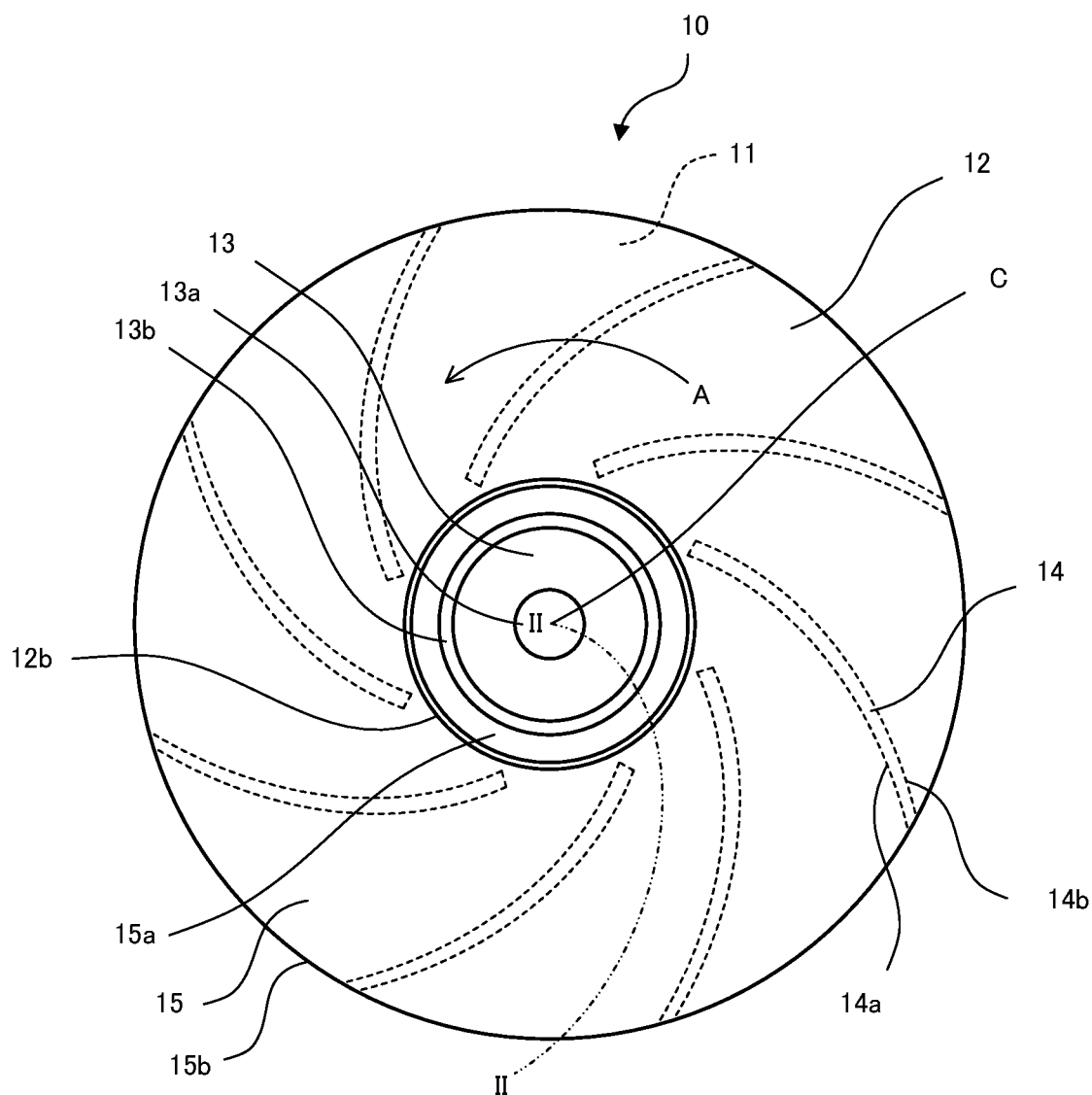
FIG. 1 illustrates an integrated impeller manufactured by a method according to an embodiment of the present invention.
Figure 2:
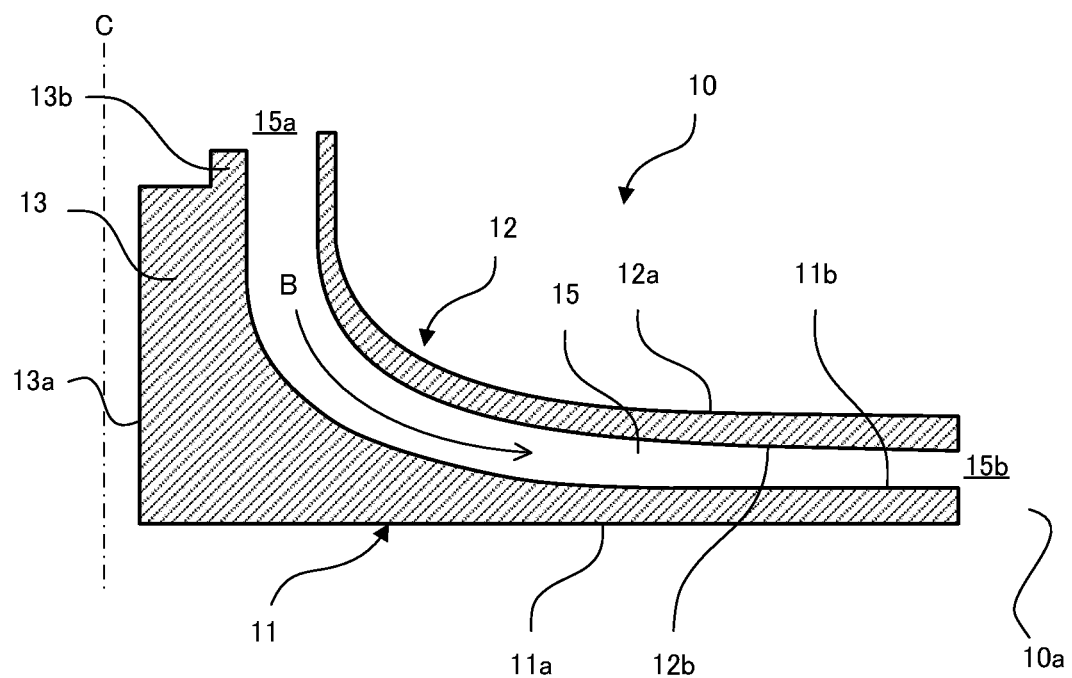
FIG. 2 illustrates a cross section taken along line II-II of FIG. 1.

FIG. 1 illustrates an integrated impeller manufactured by a method according to an embodiment of the present invention. FIG. 2 illustrates a cross section taken along line II-II of FIG. 1.

The structure of an integrated impeller 10 manufactured by a method according to the present embodiment will be described.

The integrated impeller 10 has a first shroud 11 forming the bottom portion thereof, a second shroud 12 forming the lid portion thereof, a hub 13 formed at the center of the first shroud 11, and blades 14 that section flow paths 15 which are formed between the first shroud 11 and the second shroud 12 and through which fluid flows. The first shroud 11, second shroud 12, hub 13, and blades 14 are integrally formed.

As illustrated in FIG. 2, the first shroud 11 has a flat bottom surface 11a and is a disk-shaped part as a whole. The hub 13 through which a hole 13a penetrates is formed at the center of the first shroud 11. A first surface 11b is formed on the side opposite to the bottom surface 11a of the first shroud 11. The first surface 11b preferably extends parallel to the bottom surface 11a within a predetermined length range from the outer periphery in the radial direction and then extends so as to be gradually separated from the bottom surface 11a toward the hub 13. The part of the first surface 11b separated from the bottom surface 11a is formed preferably in a smooth curved surface. The first surface 11b may be formed without having a flat surface and continuously separated from the bottom surface 11a from the outer periphery toward the hub 13.

The second shroud 12 is a disk-shaped part that covers the first surface 11b of the first shroud 11. The second shroud 12 has an outside surface 12a which is formed so as to be gradually separated from the bottom surface 11a from the outer periphery toward the hub 13 in the radial direction. A second surface 12b is formed on the side opposite to the outside surface 12a. That is, the second surface 12b of the second shroud 12 is formed opposite to the first surface 11b of the first shroud 11.

The hub 13 is a columnar part formed at the center of the first shroud 11 and has, at its center, a hole 13a through which a not-shown shaft member is inserted. A wall part 13b is formed at the outer periphery of the surface of the hub 13 on the side opposite to the bottom surface 11a.

The blade 14 is connected to the first surface 11b of the first shroud 11 and the second surface 12b of the second shroud 12. The blade 14 is formed so as to be curved from the outer circumferential side toward a center axis C. The concave side of the curved blade 14 is referred to as a concave surface 14a, and the convex side thereof is as a convex surface 14b. The distance between the adjacent blades 14 becomes smaller toward the center axis C. That is, the blade 14 sections the flow path 15 in the circumferential direction such that the width of the flow path 15 becomes smaller toward the center. The blade 14 may be integrally formed with the hub 13, that is, the blade 14 may be connected to the hub 13.

As described above, the integrated impeller 10 has a plurality of flow paths 15 surrounded by the first shroud 11, second shroud 12, hub 13, and blades 14. The flow path 15 has an entrance 15a which is sandwiched between the second shroud 12 and the hub 13 and formed in an annular shape and an exit 15b which is formed at the outer periphery sandwiched between the first shroud 11 and the second shroud 12. In the present embodiment, eight flow paths 15 are formed by eight blades 14.

The following describes the operation of the integrated impeller 10 manufactured by a method according to the present embodiment.

The integrated impeller 10 according to the present embodiment is rotated by a not-shown drive part such a motor. When the impeller 10 is rotated in the direction denoted by the arrow A of FIG. 1, air flowing in the impeller 10 from the entrance 15a flows as denoted by the arrow B of FIG. 2, accelerated in the impeller 10, and discharged from the exit 15b.

The following describes a manufacturing method for the integrated impeller 10 according to the present embodiment.

Figure 3:
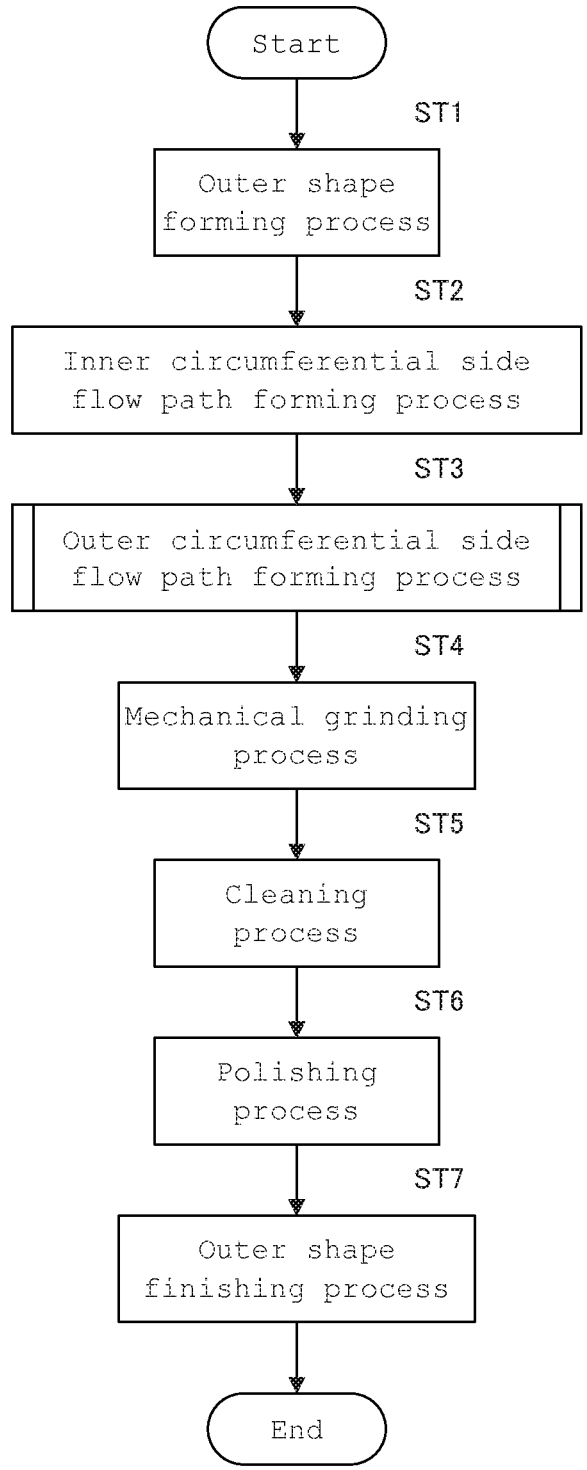
FIG. 3 is a flowchart illustrating a manufacturing method for the integrated impeller according to the present embodiment.
Figure 4:
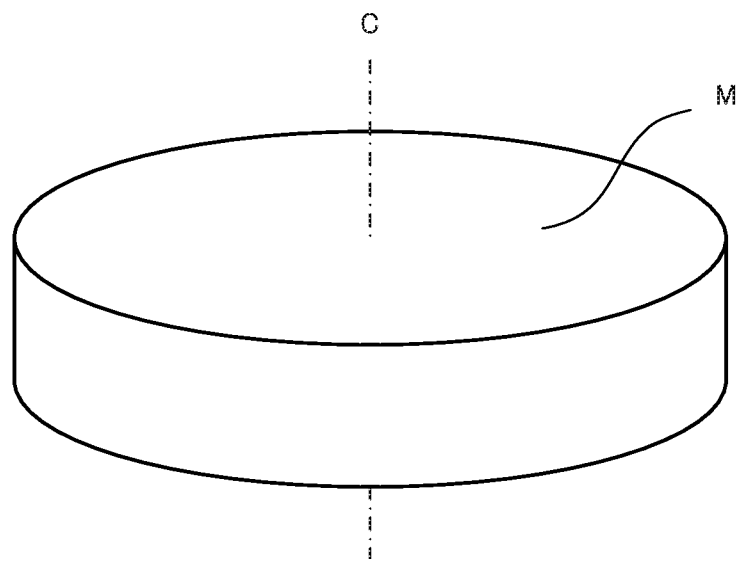
FIG. 4 illustrates the integrated impeller according to the present embodiment in a state before manufacturing.

FIG. 3 is a flowchart illustrating the manufacturing method for the integrated impeller 10 according to the present embodiment. FIG. 4 illustrates the integrated impeller 10 according to the present embodiment in a state before manufacturing.

In the manufacturing method for the integrated impeller 10 according to the present embodiment, an outer shape forming process is first executed in step 1 (ST1). The integrated impeller 10 is manufactured from a columnar-shaped material M. The material M is metal such as carbon steel or stainless steel. The column may have the same height and diameter as the impeller.

Figure 5:
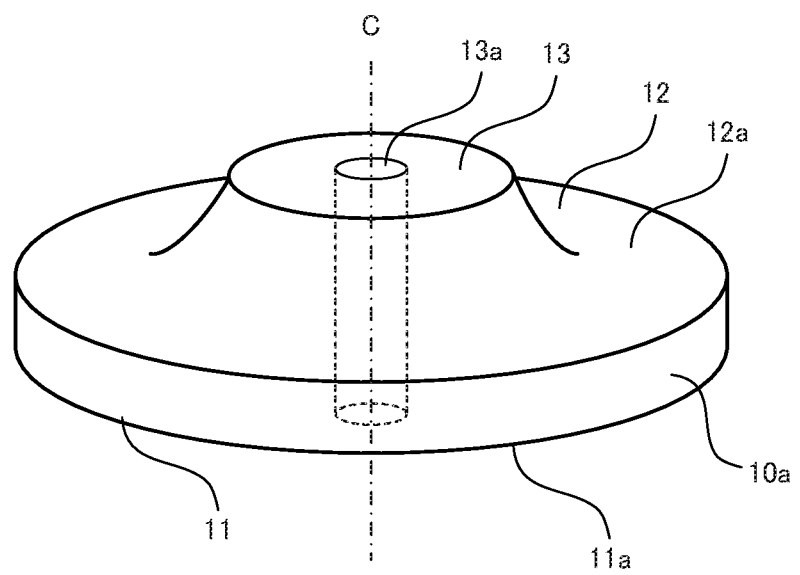
FIG. 5 illustrates the integrated impeller according to the present embodiment in a state after the outer shape forming process.

FIG. 5 illustrates the integrated impeller 10 according to the present embodiment in a state after the outer shape forming process.

In the outer shape forming process for the integrated impeller 10 according to the present embodiment, the hub 13 is formed around the center axis C of the material M illustrated in FIG. 4. The hub 13 may be formed by machining the outside surface 12a of the second shroud 12 using a lathe machine, etc. The outside surface 12a of the second shroud 12 is formed preferably so as to be gradually separated from the bottom surface 11a of the first shroud 11 from the outer circumferential side toward the inner circumferential side. Further, in the outer shape forming process for the integrated impeller 10 according to the present embodiment, the hole 13a through which a rotary shaft is inserted is formed with the center axis C as the center. The hole 13a may be formed by using a lathe machine, etc.

The outside surface 12a of the second shroud 12 may have a flat surface parallel to the bottom surface 11a at the outer circumferential side as a reference surface to be used. Further, recessed parts may be previously formed in the hub 3 and an outer circumferential part 10a, respectively, at portions corresponding respectively to the entrance 15a and exit 15b of the flow path 15 illustrated in FIG. 2. By previously forming the recessed parts, the time required to form the flow path can be reduced.

Subsequently, as illustrated in FIG. 3, an inner circumferential side flow path forming process is executed in step 2 (ST2).

Figure 6:
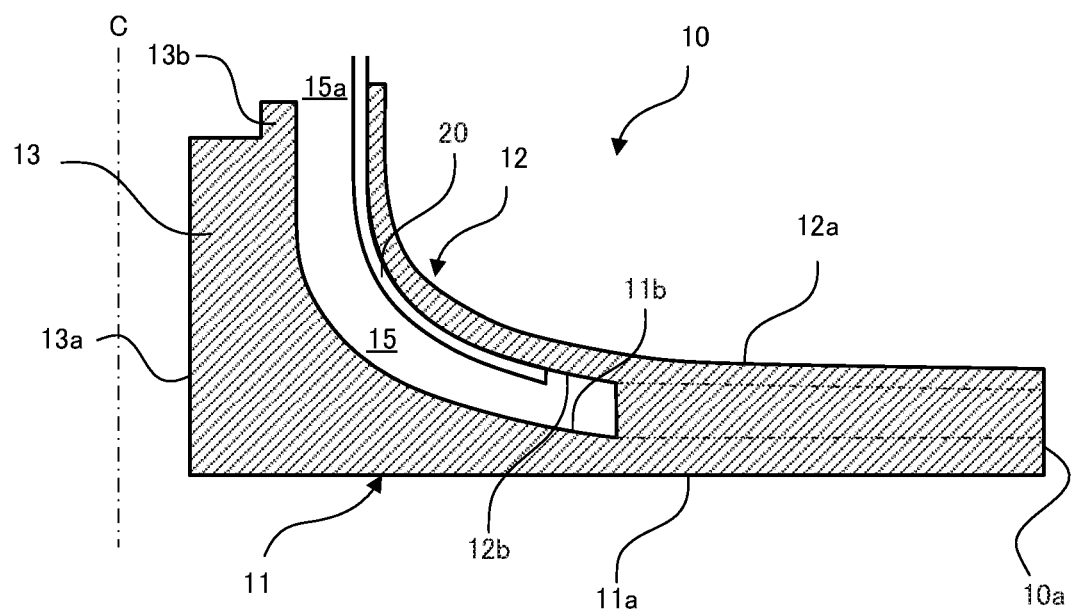
FIG. 6 illustrates a state where an electrode to be used in the inner circumferential side flow path forming process for the integrated impeller according to the present embodiment is projected on a cross section parallel to the center axis.
Figure 7:
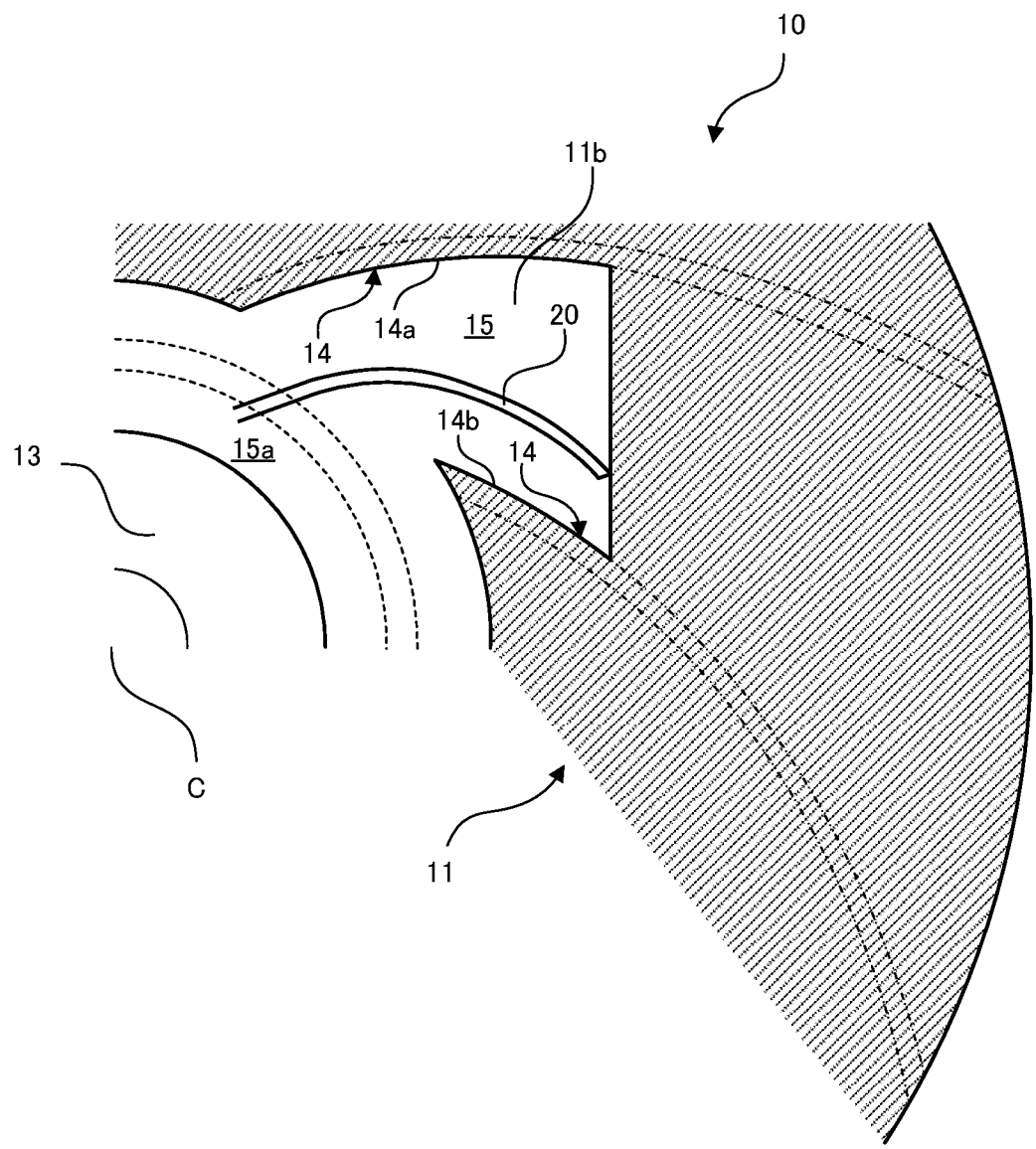
FIG. 7 illustrates a state where the electrode to be used in the inner circumferential side flow path forming process for the integrated impeller according to the present embodiment is projected on a cross section perpendicular to the center axis.

FIG. 6 illustrates a state where an electrode to be used in the inner circumferential side flow path forming process for the integrated impeller 10 according to the present embodiment is projected on a cross section parallel to the center axis. FIG. 7 illustrates a state where the electrode to be used in the inner circumferential side flow path forming process for the integrated impeller 10 according to the present embodiment is projected on a cross section perpendicular to the center axis. In FIGS. 6 and 7, a completed shape is denoted by the long dashed double-dotted line (the same hereinafter).

In the inner circumferential side flow path forming process, a recessed part is first formed at apart of the hub 3 corresponding to the entrance 15a of the flow path 15 by diesinking electric discharge machining or mechanical machining. The recessed part may be formed roughly. Subsequently, as illustrated in FIGS. 6 and 7, an electrode 20 is inserted from the entrance 15a, and the inner circumferential side flow path 15 is finished by electric discharge machining. The electrode 20 has its leading end formed in a curved shape conforming to the shape of the flow path. A plurality of electrodes having different shapes may be used as the electrode 20. Thus configured electrode 20 is used to machine the first surface 11b of the first shroud 11, second surface 12b of the second shroud 12, concave and convex surfaces 14a and 14b of the blade 14. The formation range of the inner circumferential side flow path may be appropriately determined according to the shape of the flow path.

Subsequently, as illustrated in FIG. 3, an outer circumferential side flow path forming process is executed in step 3 (ST3).

Figure 8:
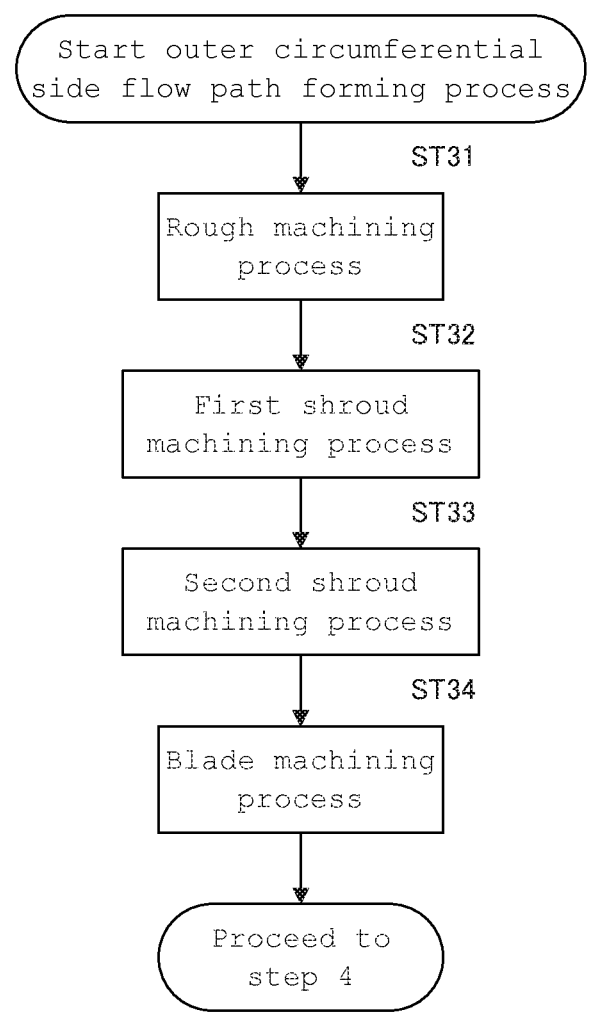
FIG. 8 illustrates a sub-flowchart illustrating an outer circumferential side flow path forming process in the manufacturing method for the integrated impeller according to the present embodiment.

FIG. 8 illustrates a sub-flowchart illustrating the outer circumferential side flow path forming process in the manufacturing method for the integrated impeller 10 according to the present embodiment.

In the outer circumferential side flow path forming process, a rough machining process is first executed in step 31 (ST31).

Figure 9:
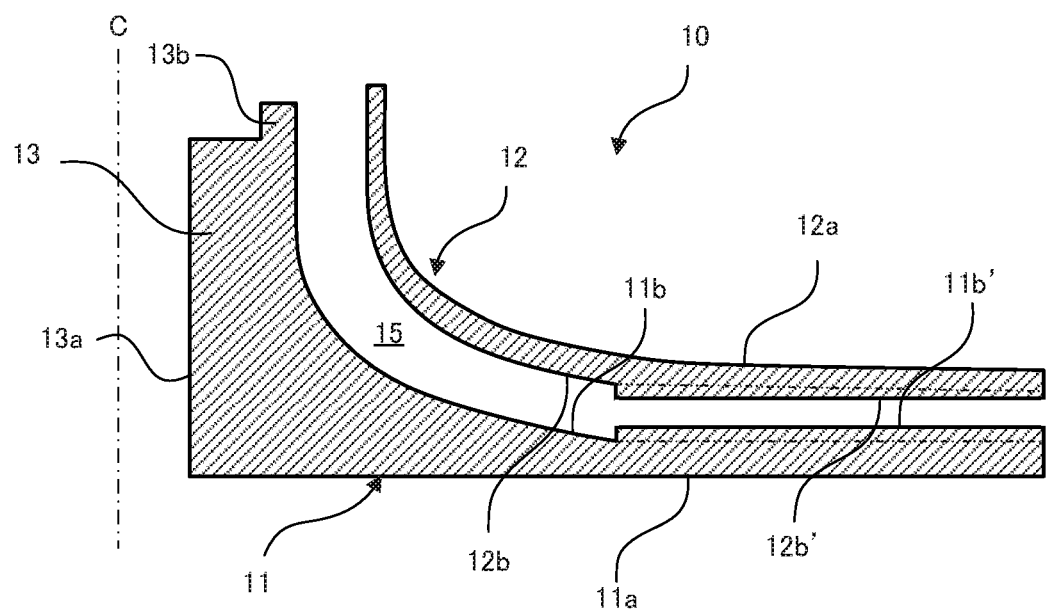
FIG. 9 illustrates a state where the flow path after a rough machining process for the integrated impeller according to the present embodiment is projected on a cross section parallel to the center axis.
Figure 10:
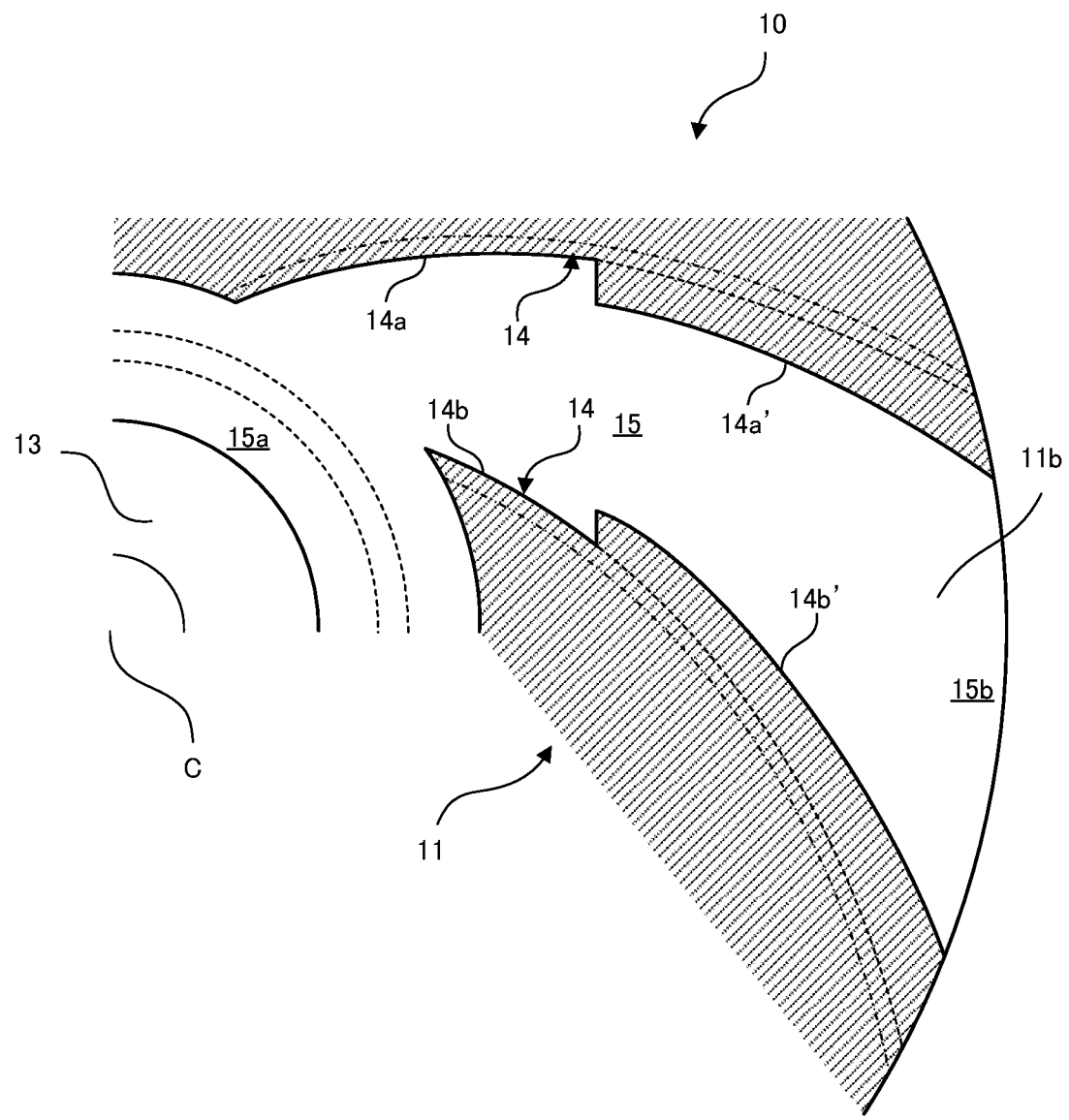
FIG. 10 illustrates a state where the flow path after the rough machining process for the integrated impeller according to the present embodiment is projected on a cross section perpendicular to the center axis.

FIG. 9 illustrates a state where the flow path after the rough machining process for the integrated impeller 10 according to the present embodiment is projected on a cross section parallel to the center axis. FIG. 10 illustrates a state where the flow path after the rough machining process for the integrated impeller 10 according to the present embodiment is projected on a cross section perpendicular to the center axis.

In the rough machining process, the flow path 15 is formed smaller than a finished dimension by mechanical machining or electric machining. For example, as illustrated in FIG. 9, a tentative first surface 11b' is formed at the outer circumferential side of the first surface 11b of the first shroud 11, and a tentative second surface 12b' is formed at the outer circumferential side of the second surface 12b of the second shroud 12. Further, as illustrated in FIG. 10, a tentative concave surface 14a' and a tentative convex surface 14b' are formed at the outer circumferential side of the concave surface 14a and convex surface 14b of the blade 14 so as to make the width of the flow path 15 smaller than that of the finished flow path 15. The rough machining may be executed within the reaching range of tools.

Subsequently, in the outer circumferential side flow path forming process of FIG. 8, a first shroud machining process is executed in step 32 (ST32).

Figure 11:
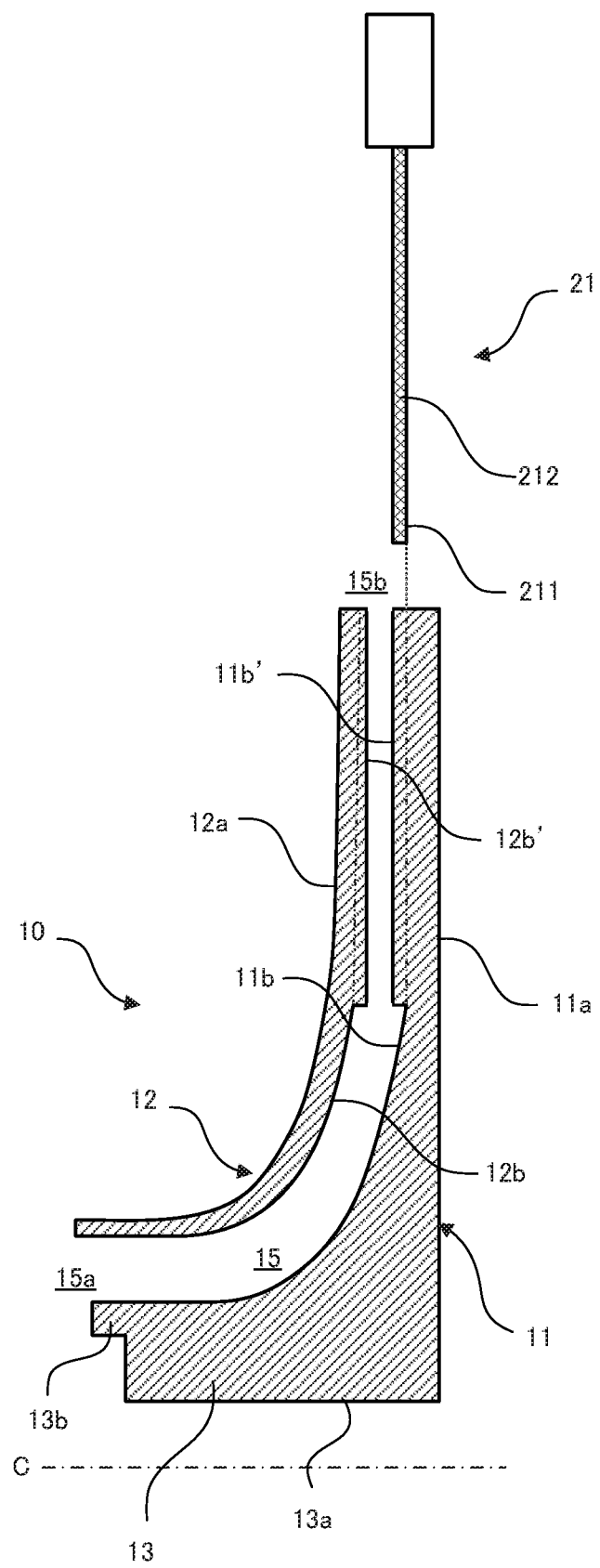
FIG. 11 illustrates the setting state of a linear electrode before the first shroud machining process for the integrated impeller according to the present embodiment.
Figure 12:
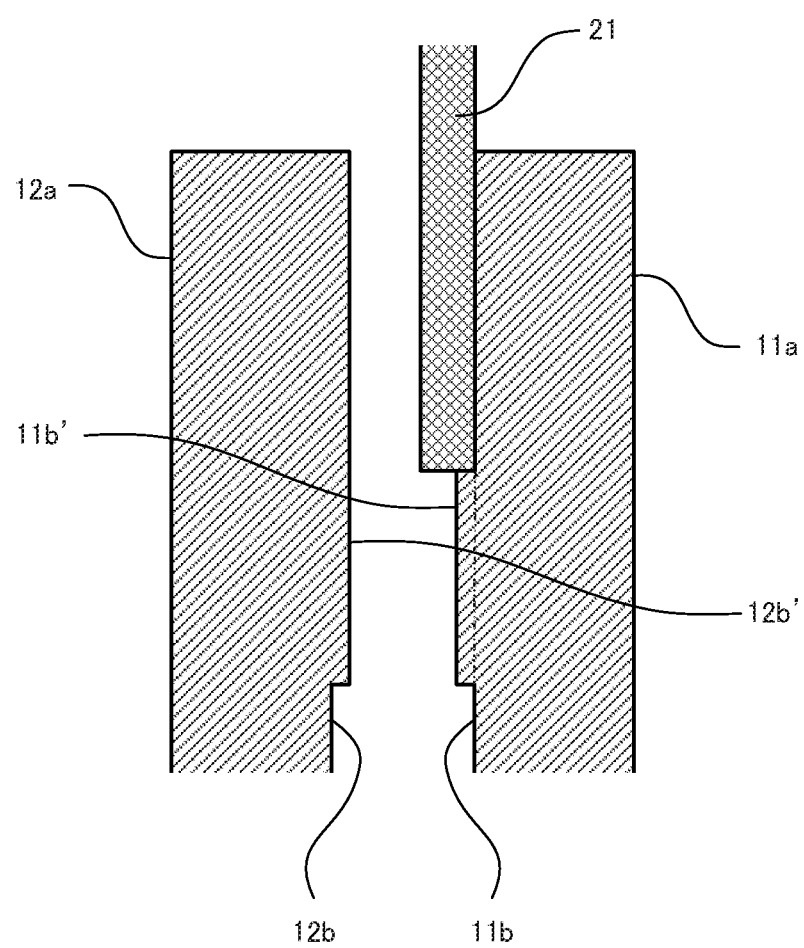
FIG. 12 illustrates the cross section of the integrated impeller according to the present embodiment including the linear electrode and center axis in the first shroud machining process.
Figure 13:
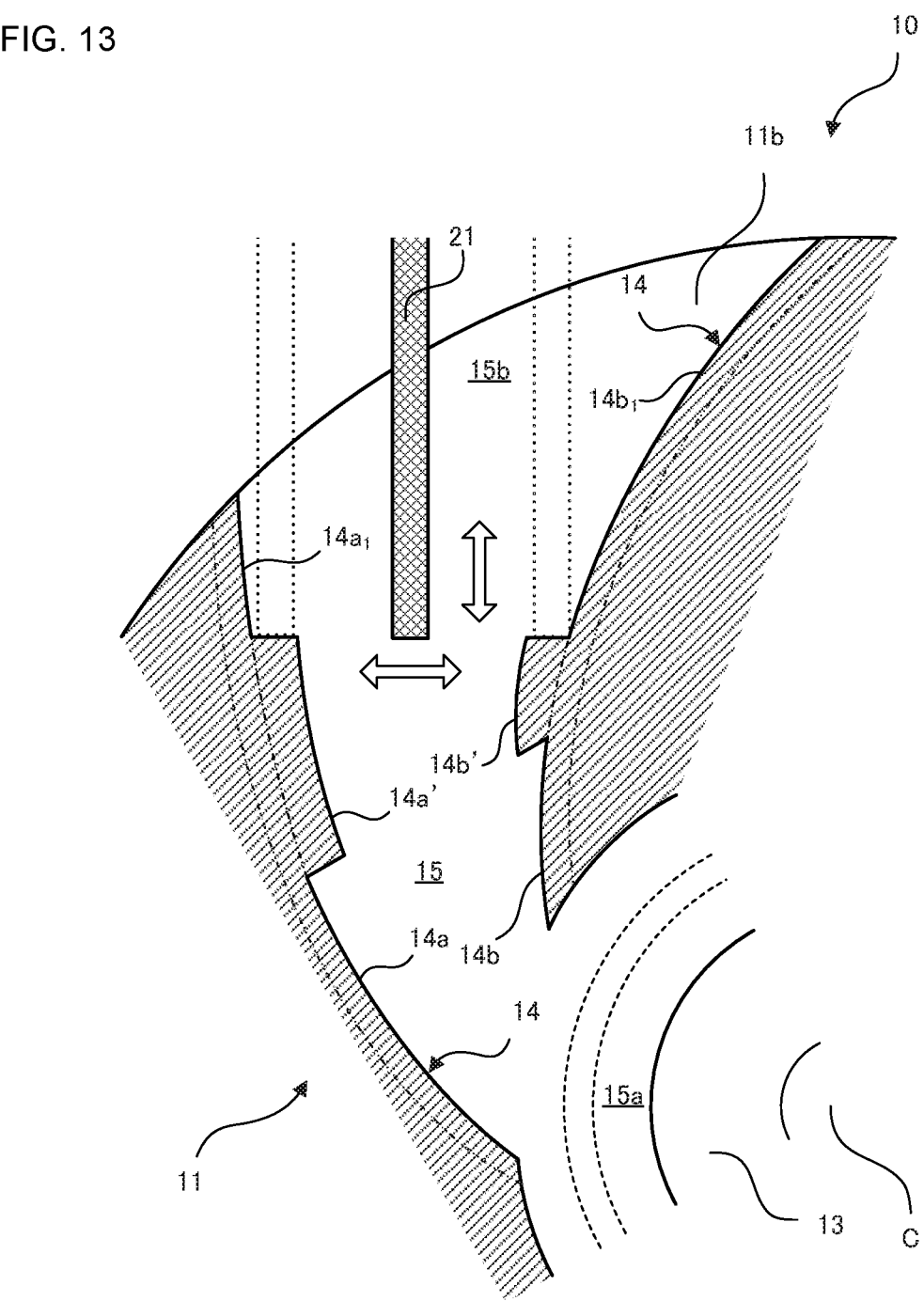
FIG. 13 is a state where the flow path is projected on a cross section including the linear electrode and being perpendicular to the center axis in the first shroud machining process for the integrated impeller according to the present embodiment.

FIG. 11 illustrates the setting state of a linear electrode 21 before the first shroud machining process for the integrated impeller 10 according to the present embodiment. FIG. 12 illustrates the cross section of the integrated impeller 10 according to the present embodiment including the linear electrode 21 and center axis C in the first shroud machining process. FIG. 13 is a state where the flow path is projected on a cross section including the linear electrode 21 and being perpendicular to the center axis C in the first shroud machining process for the integrated impeller 10 according to the present embodiment.

In the first shroud machining process for the integrated impeller 10 according to the present embodiment, the linear electrode 21 having a columnar shape is rotated about a longitudinal direction axis thereof to perform generating electric discharge machining. The linear electrode 21 is made of an alloy of copper, tungsten, copper tungsten, carbon, or other material and has a diameter insertable into the flow path 15.

The linear electrode 21 has a tip-end part 211 and a base-end part 212. Only the tip-end part 211 may be made of the above-mentioned material (alloy of copper, tungsten, copper tungsten, carbon, or other material), while the base-end part 212 may be made of a hard material and hard to bend, such as an iron-based material, an alloy material such as hard metal alloy or titanium alloy, or a fiber composite resin material such as CFRP. In this case, the tip-end part 211 may be attached by screwing into the base-end part 212. Thus, by using the iron-based material for the base-end part 212 of the linear electrode 21, the base-end part 212 has high strength, allowing the electrode to be inserted from a narrow opening to be formed thin.

The linear electrode 21 can be changed in installation angle. Further, the linear electrode 21 can be moved in the vertical direction. Furthermore, the linear electrode 21 can be moved at least in one horizontal direction. The linear electrode 21 according to the present embodiment can be moved in a direction perpendicular to the center axis C.

First, as illustrated in FIG. 11, the linear electrode 21 is set such that the extension line of the outer surface of the linear electrode 21 is aligned with the first surface 11b of the finished first shroud 11 of the integrated impeller 10. For example, when the first surface 11b of the first shroud 11 is a flat surface parallel to the bottom surface 11a, the integrated impeller 10 is installed such that the center axis C thereof extends in the horizontal direction, and the linear electrode 21 is installed in the vertical direction, whereby installation time can be reduced.

Subsequently, the linear electrode 21 is moved to machine the first surface 11b of the first shroud 11, as illustrated in FIGS. 12 and 13. The blade 14 has been machined only on the first shroud 11 side, and a concave surface $14a_1$ in a first state and a convex surface $14b_1$ in a first state which are yet to be finished are formed.

Figure 14:
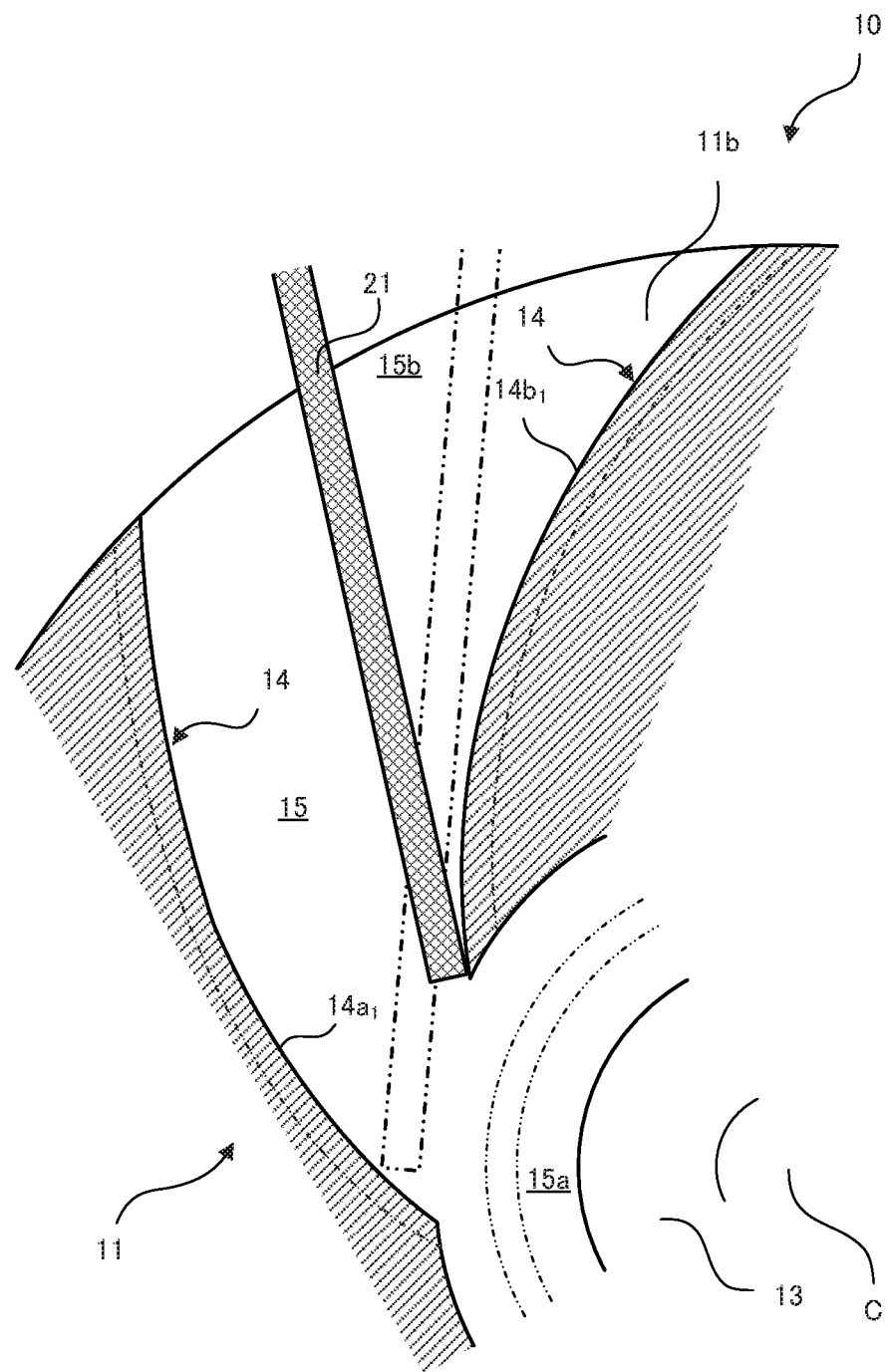
FIG. 14 illustrates a case where the linear electrode is inserted into the inner circumferential side of the flow path.

FIG. 14 illustrates a case where the linear electrode 21 is inserted into the inner circumferential side of the flow path 15.

In a case where the linear electrode 21 installed as illustrated in FIG. 11 is moved, but does not reach the inner circumferential side flow path 15 formed in the inner circumferential side flow path forming process of step 2 of FIG. 3, the angle of the linear electrode 21 may be changed as illustrated in FIG. 14. For example, when the curvature of the blade 14 is large, the linear electrode 21 installed in the vertical direction may not reach the inner circumferential side blade 14 near the center axis C even when it is simply vertically moved. In such a case, as illustrated in FIG. 14, the installation angle of the linear electrode 21 may be changed so as to allow the linear electrode 21 to reach the blade 14.

Subsequently, in the outer circumferential side flow path forming process of FIG. 8, a second shroud machining process is executed in step 33 (ST33).

Figure 15:
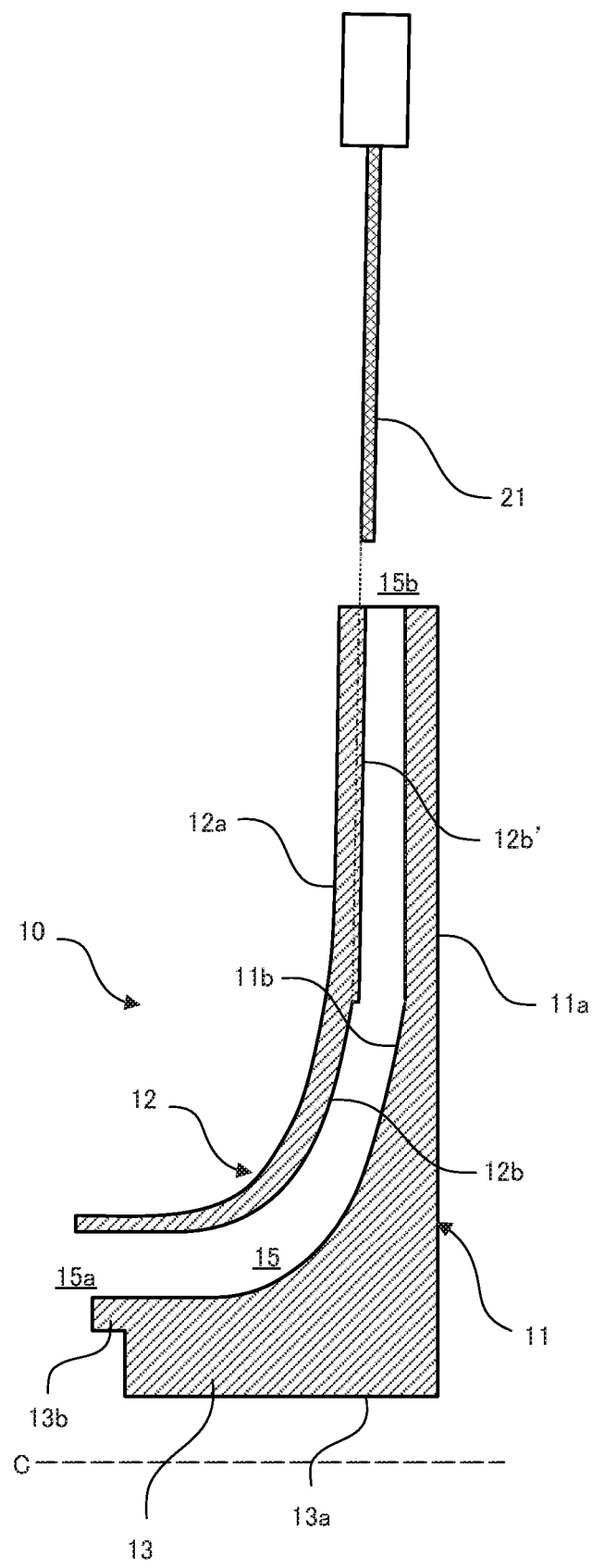
FIG. 15 illustrates the setting state of the linear electrode before a second shroud machining process for the integrated impeller according to the present embodiment.

FIG. 15 illustrates the setting state of the linear electrode 21 before the second shroud machining process for the integrated impeller 10 according to the present embodiment.

In the second shroud machining process for the integrated impeller 10 according to the present embodiment, the linear electrode 21 having a columnar shape is rotated about a longitudinal direction axis thereof to perform generating electric discharge machining, as in the first shroud machining process. The linear electrode 21 has a diameter insertable into the flow path 15. The linear electrode 21 can be changed in installation angle. Further, the linear electrode 21 can be moved in the vertical direction. Furthermore, the linear electrode 21 can be moved at least in one horizontal direction. The linear electrode 21 according to the present embodiment can be moved in a direction perpendicular to the center axis C.

First, as illustrated in FIG. 11, the linear electrode 21 is set such that the extension line of the outer surface thereof is aligned with the second surface 12*b* of the finished second shroud 12 of the integrated impeller 10.

Subsequently, the linear electrode 21 is moved to machine the second surface 12*b* of the second shroud 12 like the machining applied to the first surface 11*b* of the first shroud 11 illustrated in FIGS. 12 and 13.

Figure 16:
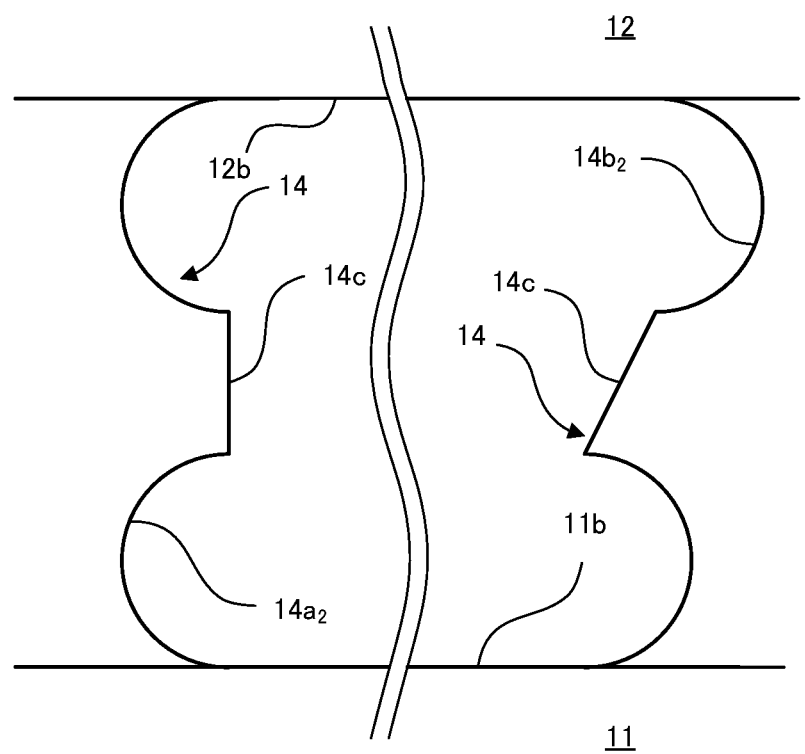
FIG. 16 illustrates the state of a blade after the second shroud machining process and before a blade machining process for the integrated impeller according to the present embodiment.

FIG. 16 illustrates the state of the blade 14 after the second shroud machining process and before a blade machining process for the integrated impeller 10 according to the present embodiment.

In this state, the blade 14 has been machined on the first shroud 11 side and on the second shroud 12 side, while a remaining part 14*c* exists at the center of the blade 14 on the first shroud 11 side and the center thereof on the second shroud 12 side. Thus, in the blade 14, a concave surface 14*a*₂ in a second state and a convex surface 14*b*₂ in a second state which are yet to be finished are formed as illustrated in FIG. 16.

Subsequently, in the outer circumferential side flow path forming process of FIG. 8, a blade machining process is executed in step 34 (ST34).

Figure 17:
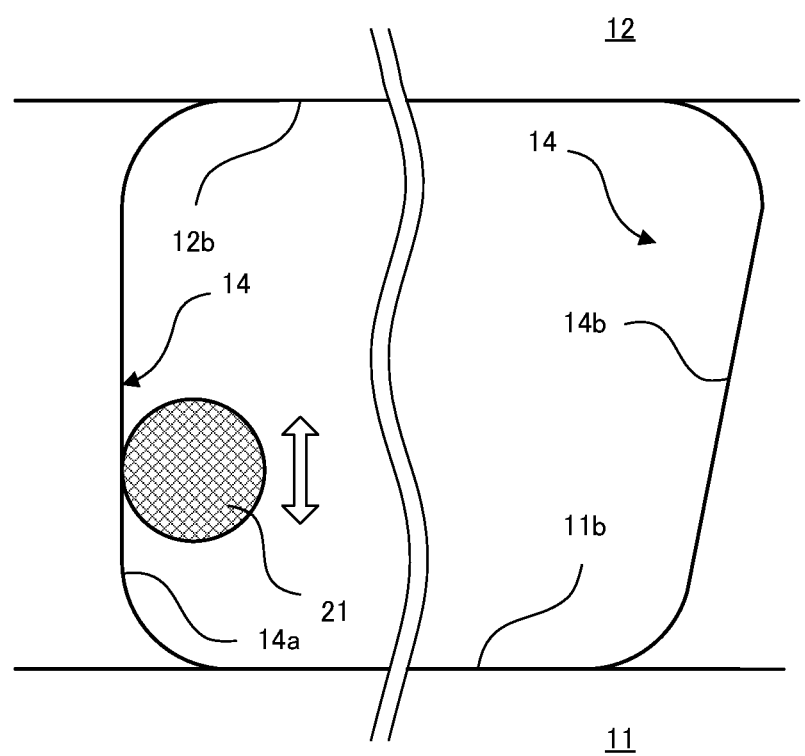
FIG. 17 illustrates the state of the blade after the blade machining process for the integrated impeller according to the present embodiment.
Figure 18:
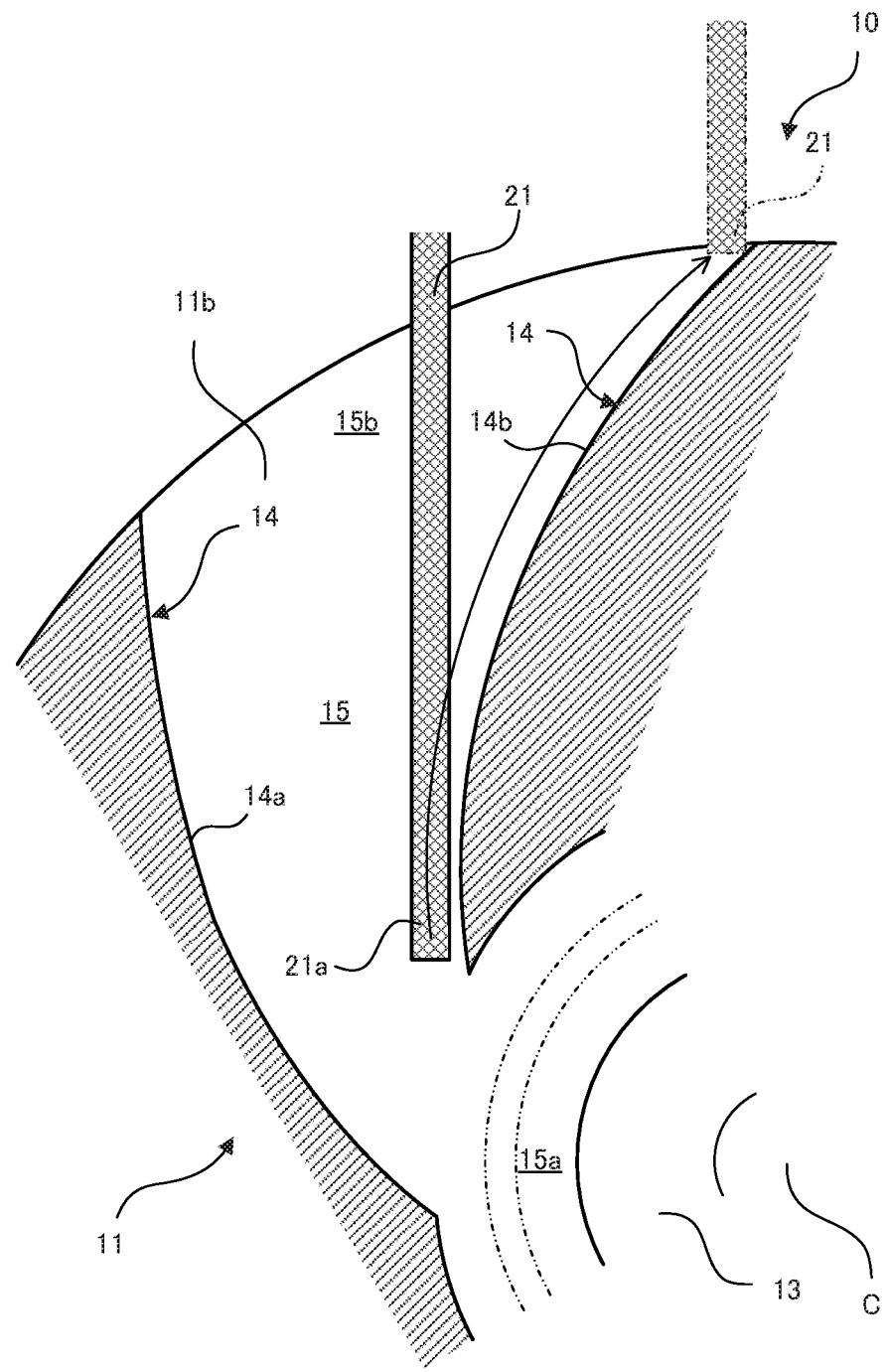
FIG. 18 illustrates the movement of the linear electrode in the blade machining process for the integrated impeller according to the present embodiment.

FIG. 17 illustrates the state of the blade 14 after the blade machining process for the integrated impeller 10 according to the present embodiment. FIG. 18 illustrates the movement of the linear electrode 21 in the blade machining process for the integrated impeller 10 according to the present embodiment.

In the blade machining process for the integrated impeller 10 according to the present embodiment, the remaining part 14*c* illustrated in FIG. 16 is machined. In the blade machining process, the linear electrode 21 is moved to the first shroud 11 side and second shroud 12 side, and the columnar-shaped linear electrode 21 is rotated about a longitudinal direction axis thereof to perform generating electric discharge machining for the remaining part 14*c* at the first shroud 11 side and second shroud 12 side using the tip end side of the linear electrode 21. The remaining part 14*c* of the blade 14 is thus machined, with the result that the concave and convex surfaces 14*a*₂ and 14*b*₂ in the second state illustrated in FIG. 16 are removed to thereby form finished concave and convex surfaces 14*a* and 14*b* as illustrated in FIG. 17.

Further, as illustrated in FIG. 18, the linear electrode 21 may be moved in such away as tracing the blade 14 from the entrance side to the exit side to machine the remaining part 14*c* illustrated in FIG. 16.

Figure 19:
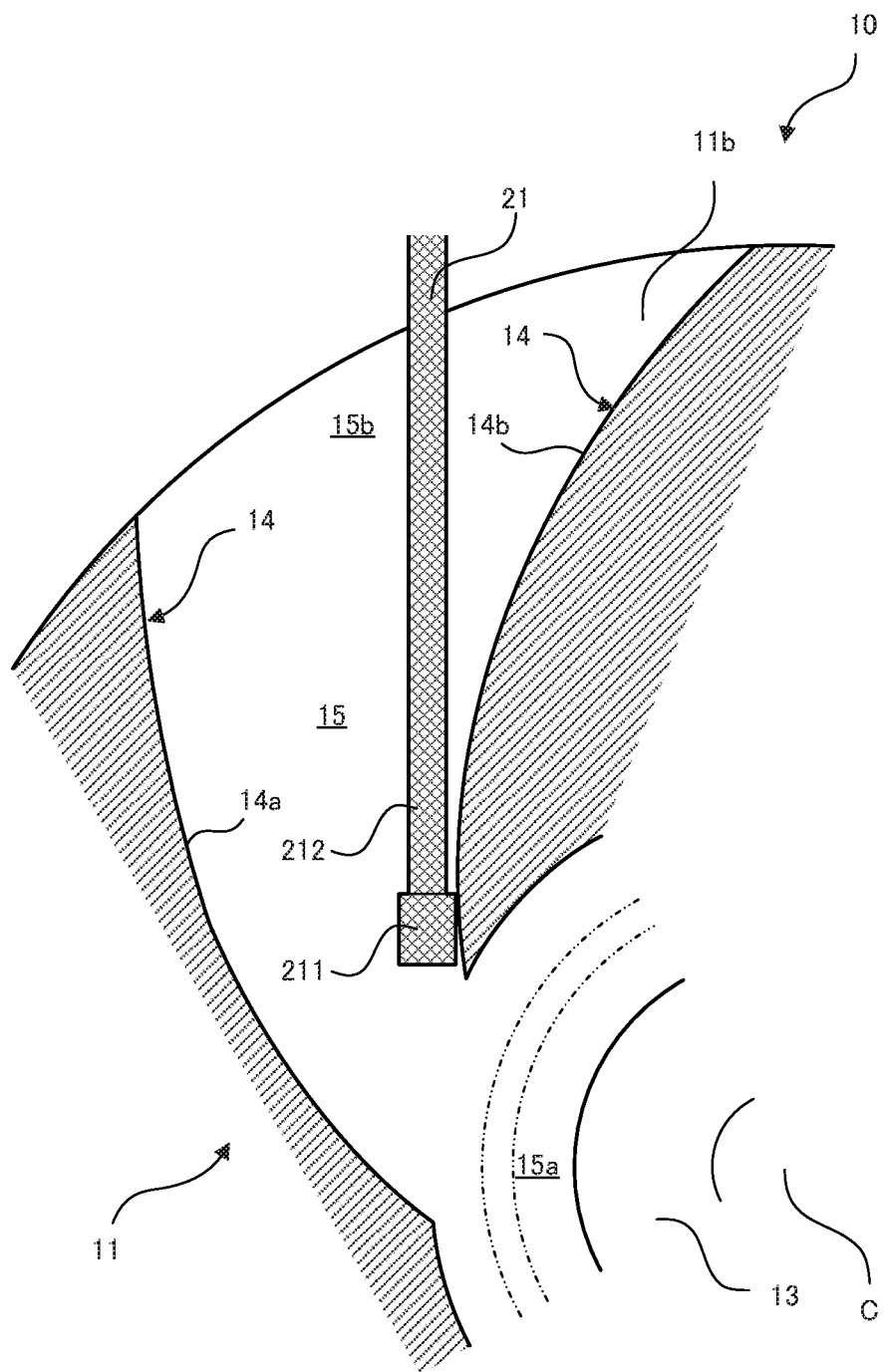
FIG. 19 illustrates another example of the linear electrode used in machining the integrated impeller according to the present embodiment.

FIG. 19 illustrates another example of the linear electrode 21 used in machining the integrated impeller 10 according to the present embodiment.

The linear electrode 21 illustrated in FIG. 19 is featured in that the diameter of the tip-end part 211 is made larger than that of the base-end part 212. In the example of FIG. 14, when the linear electrode 21 installed as illustrated in FIG. 11 does not reach the inner circumferential side flow path 15 formed in the inner circumferential side flow path forming process of step 2 of FIG. 3, the angle of the linear electrode 21 is changed. On the other hand, in the example of FIG. 19, by making the diameter of the tip-end part 211 large, it is possible to machine the blade 14 by using the corner and side surface of the tip-end part 211 without changing the angle of the linear electrode 21.

In the linear electrode 21 illustrated in FIG. 19, only the tip-end part 211 may be made of alloy of copper, tungsten, copper tungsten, carbon, or other material, while the base-end part 212 may be made of a hard material, which is hard to bend, such as an iron-based material, an alloy material such as superhard alloy or titanium alloy, or a fiber composite resin material such as CFRP. In this case, the tip-end part 211 may be attached by screwing into the base-end part 212. Thus, by using the iron-based material for the base-end part 212 of the linear electrode 21, the base-end part 212 has high strength, allowing the electrode to be inserted from a narrow opening to be formed thin. In this case, the base-end part 212 can be used in common, while the tip-end part 211 is used as a replaceable member, thus allowing reduction in cost and delivery time.

FIGS. 20A to 20G illustrate other examples of the tip-end part 211 of the linear electrode 21 used in machining the integrated impeller 10 according to the present embodiment.

FIG. 20A illustrates an example of the tip-end part 211 of the linear electrode 21 featured in that the diameter of the tip-end part 211 is made larger than that of the base-end part 212 and that a C-relief part 21*a* is formed on the base-end part 212 side of the tip-end part 211. Thus forming the C-relief part 21*a* allows the linear electrode 21 to be moved to the further inner circumferential side of the flow path 15 without contacting the convex surface 14*b* of the blade 14 illustrated in FIG. 19. This makes it possible to machine even the inner circumferential side of the blade 14, allowing reduction in machining time.

FIG. 20B illustrates an example of the tip-end part 211 of the linear electrode 21 featured in that the diameter of the tip-end part 211 is made larger than that of the base-end part 212 and that an R-relief part 21*b* having a curved surface is formed on the base-end part 212 side of the tip-end part 211. Thus forming the R-relief part 21*b* allows the linear electrode 21 to be moved to the further inner circumferential side of the flow path 15 without contacting the convex surface 14*b* of the blade 14 illustrated in FIG. 19. This makes it possible to machine even the inner circumferential side of the blade 14, allowing reduction in machining time.

FIG. 20C illustrates an example of the tip-end part 211 of the linear electrode 21 featured in that the diameter of the tip-end part 211 is made larger than that of the base-end part 212 and that a C-chamfered part 21*c* is formed at the distal end of the tip-end part 211. Thus forming the C-chamfered part 21c allows reduction in level difference caused by a movement pitch. Further, interference with the blade 14 can be reduced to allow reduction in machining time.

FIG. 20D illustrates an example of the tip-end part 211 of the linear electrode 21 featured in that the diameter of the tip-end part 211 is made larger than that of the base-end part 212 and that an R-chamfered part 21d is formed at the distal end of the tip-end part 211. Thus forming the R-chamfered part 21d allows reduction in level difference caused by a movement pitch. Further, interference with the blade 14 can be reduced to allow reduction in machining time.

FIG. 20E illustrates an example of the tip-end part 211 of the linear electrode 21 featured in that the diameter of the tip-end part 211 is made larger than that of the base-end part 212 and that the side surface of the tip-end part 211 is formed in a curved surface 21e. The curved surface 21e is preferably a convex surface or a concave surface conforming to the curvature of the flow path. Thus forming the side surface of the tip-end part 211 with a curved surface conforming to the curvature of the flow path allows reduction in machining time of the flow path 15 having a curvature.

FIG. 20F illustrates an example in which the tip-end part 211 of the linear electrode 21 is formed into a sphere. Thus forming the tip-end part 211 into a sphere allows reduction in level difference caused by a movement pitch. Further, interference with the blade 14 can be reduced to allow reduction in machining time.

FIG. 20G illustrates an example in which the tip-end part 211 of the linear electrode 21 is formed into a prism shape or a rectangular parallelepiped shape. Thus forming the side surface of the tip-end part 211 in a flat surface shape allows accuracy in smoothing the surface to be enhanced. Further, the time required for smoothing the surface can be reduced.

When the tip-end part 211 of the linear electrode 21 is formed into a prism shape or a rectangular parallelepiped shape as illustrated in FIG. 20G, the linear electrode 21 need not be rotated. Further, the corner of the tip-end part 211 formed into a prism shape or a rectangular parallelepiped shape may be C-chamfered or R-chamfered, and the flat surface thereof may be altered to a curved one.

As described above, after the completion of the outer circumferential side flow path forming process of step 3 in the manufacturing method for the integrated impeller 10 according to the present embodiment, the flow proceeds to step 4 of the flowchart illustrated in FIG. 3.

In step 4, a mechanical grinding process is executed (ST4). When the flow path is machined from the inner and outer circumferential sides in the inner circumferential side flow path forming process of step 2 and outer circumferential side flow path forming process of step 3, a minute level difference is generated at the connection portion between the inner circumferential side flow path and the outer circumferential side flow path. The mechanical grinding process is executed for smoothing the minute level difference generated at the connection portion. In the mechanical grinding, a grinder having a rod-shaped grindstone, a flat grindstone, or a rotary grindstone is used. Alternatively, the smoothing may be performed by, e.g., hand grinding using abrasive powder.

Subsequently, in step 5, a cleaning process is executed (ST5). The cleaning process is executed for removing oil or dirt stuck to the impeller 10 in the inner circumferential side flow path forming process of step 2 of FIG. 3, and mechanical grinding process of step 4. In general, a commercially available parts cleaner can be used in the cleaning process.

Insufficient cleaning may result in lack of uniformity in a polishing process to be executed after the cleaning process. In particular, when chemical polishing, electropolishing, or the like is performed in the following polishing process (that is, when a chemical is used to perform the following polishing process), the sticking of oil or dirt to the surface partially inhibits the contact of polishing liquid to the work surface, which may result in uneven polishing.

When the electropolishing is performed in the polishing process, current may be applied to circulate polishing liquid for a certain period of time before polishing, whereby the cleaning process can be performed at the same time. Further, when the impeller 10 has less dirt, or when mechanical polishing is performed using an abrasive, the cleaning process may be omitted.

Subsequently, in step 6, a polishing process is executed (ST6). In the polishing process, the surface of the flow path 15 after the cleaning process is polished to remove an altered layer generated in electric discharge machining and improve smoothness of the surface of the impeller 10. Remaining of the altered layer can cause metal fatigue, which may shorten the lifetime of the impeller 10.

The polishing process is performed by a fluid polishing method, a chemical polishing method, electropolishing method, or the like. In the fluid polishing, a medium obtained by mixing abrasive grains in a special clay-like material is poured into the flow path 15 of the impeller 10 under high pressure to thereby smooth the surface of the flow path 15. In the chemical polishing, masking is applied to a portion not to be polished, and then the impeller 10 is immersed in chemical polishing liquid for a certain period of time to thereby smooth an unmasked portion. As the chemical polishing liquid, commercially available one may be selected according to the material.

In the electropolishing, an electrode is used, and the impeller 10 is immersed in electropolishing liquid. Then, energizing is performed with the impeller 10 side being positive and the electrode side being negative to melt metal on the surface of the flow path 15. When irregularity exists on the surface to be machined, the projecting part is positioned closer to the electrode than the recessed part is and is thus melted at a higher speed. Thus, the electropolishing can not only smooth the surface of the flow path 15, but also eliminate the irregularity to flatten the surface and is thus commonly used.

In the electropolishing, a portion that need not be polished may be polished. In order to cope with this, an electrode having a shape similar to that of the flow path 15 may be used. In order to polish the surface uniformly, it is necessary to reliably perform surface renewal of the electropolishing liquid, and the shape of a tool may be appropriately changed for blowout of machining liquid, sealing of an opening, and smooth discharge of hydrogen generated during the electropolishing. As the electropolishing liquid, commercially available one may be selected according to the material. Depending on an electrical condition to be applied or machining time, smoothness equal to or less than Ra2 μm can be achieved as surface roughness.

Subsequently, in step 7, an outer shape finishing process is executed (ST7). In the outer shape finishing process, the outer shape is finished by mechanical machining so that the dimension of the entire impeller 10 becomes a prescribed value.

As described above, according to the manufacturing method for the integrated impeller 10 according to the present embodiment, it is possible to manufacture the impeller 10 excellent in machining accuracy and low in cost with a short lead time.

The manufacturing method for the integrated impeller 10 according to the present embodiment having the first shroud 11 forming the bottom portion thereof, the second shroud 12 forming the lid portion thereof, the hub 13 formed at the center of the first shroud 11, and the blades 14 that section flow paths 15 which are formed between the first shroud 11 and the second shroud 12 and through which fluid flows includes the steps of: forming the flow path on the inner circumferential side of the impeller 10; and forming the flow path on the outer circumferential side of the impeller 10. The step of forming the flow path on the outer circumferential side of the impeller 10 includes the steps of: while rotating the linear electrode about a longitudinal direction axis thereof, applying the electric discharge machining to the first shroud 11; applying the electric discharge machining to the second shroud 12; and applying the electric discharge machining to the blade 14. Thus, there is no need to produce an electrode having a special shape, so that it is possible to manufacture the impeller 10 excellent in machining accuracy and low in cost with a short lead time.

In the manufacturing method for the integrated impeller 10 according to the present embodiment, the center axis C of the impeller 10 and the axis of the linear electrode 21 in the longitudinal direction thereof are set perpendicular to each other in the step of applying the electric discharge machining to the first shroud 11, so that machining can be performed only by vertically moving the linear electrode 21, allowing reduction in machining time.

In the manufacturing method for the integrated impeller 10 according to the present embodiment, the linear electrode 21 can be changed in installation angle, so that it is possible to change the installation angle of the linear electrode 21 according to the shape of the flow path 15, allowing reduction in machining time.

In the manufacturing method for the integrated impeller 10 according to the present embodiment, the tip-end part 211 of the linear electrode 21 is made of a material different from that of the base-end part 212, so that the base-end part 212 can be used in common, while the tip-end part 211 is used as a replaceable member, thus allowing reduction in cost and delivery time.

In the manufacturing method for the integrated impeller 10 according to the present embodiment, the linear electrode 21 is formed such that the diameter of the tip-end part 211 is made larger than that of the base-end part 212, so that it is possible to machine even the inner circumferential side of the blade 14, allowing reduction in machining time.

In the manufacturing method for the integrated impeller 10 according to the present embodiment, the tip-end part 211 of the linear electrode 21 is formed into a prism shape, so that accuracy in smoothing the surface can be enhanced. Further, the time required for smoothing the surface can be reduced.

In the manufacturing method for the integrated impeller 10 according to the present embodiment, the linear electrode 21 has the relief part 21a or 21b on the base-end part 212 side of the tip-end part 211, so that interference with the blade 14 can be reduced to allow reduction in machining time. Further, a level difference caused by a movement pitch can be reduced to enhance machining accuracy.

In the manufacturing method for the integrated impeller 10 according to the present embodiment, the linear electrode 21 has the chamfered part 21c or 21d at the distal end of the tip-end part 211, so that interference with the blade 14 can be reduced to allow reduction in machining time. Further, a level difference caused by a movement pitch can be reduced to enhance machining accuracy.

In the manufacturing method for the integrated impeller 10 according to the present embodiment, the side surface of the linear electrode 21 is formed in the curved surface 21e, allowing reduction in machining time of the flow path 15 having a curvature.

While the manufacturing method for the integrated impeller 10 according to the present embodiment has been described by way of some examples, the present invention is not limited to the above examples, and various combinations or modifications may be made.

REFERENCE SIGNS LIST

10: Integrated impeller
11: First shroud
12: Second shroud
13: Hub
14: Blade
15: Flow path
21: Linear electrode

The invention claimed is:

1. A manufacturing method for an integrated impeller having a first shroud forming a bottom portion thereof, a second shroud forming a lid portion thereof, a hub formed at a center of the first shroud, and blades that section flow paths which are formed between the first shroud and the second shroud and through which fluid flows,
the method being comprising the steps of:
forming a flow path on an inner circumferential side of the impeller; and
forming a flow path on an outer circumferential side of the impeller, wherein
the step of forming the flow path on the outer circumferential side of the impeller includes the steps of: while rotating a linear electrode having a tip-end part and a base-end part about a longitudinal direction axis thereof,
applying electric discharge machining to the first shroud;
applying electric discharge machining to the second shroud; and
applying electric discharge machining to the blade.

2. The integrated impeller manufacturing method according to claim 1, wherein
in the step of applying the electric discharge machining to the first shroud, a center axis of the impeller and an axis of the linear electrode in the longitudinal direction thereof are set perpendicular to each other.

3. The integrated impeller manufacturing method according to claim 1, wherein
the linear electrode can be changed in installation angle.

4. The integrated impeller manufacturing method according to claim 1, wherein
the tip-end part of the linear electrode is made of a material different from that of the base-end part.

5. The integrated impeller manufacturing method according to claim 1, wherein
the linear electrode is formed such that the diameter of the tip-end part thereof is made larger than that of the base-end part thereof.

6. The integrated impeller manufacturing method according to claim 5, wherein
the linear electrode has a relief part on the base-end part side of the tip-end part.

7. The integrated impeller manufacturing method according to claim 5, wherein
the linear electrode has a chamfered part at a distal end of the tip-end part.

8. The integrated impeller manufacturing method according to claim 5, wherein
the linear electrode has a curved side surface at its tip-end part.

9. The integrated impeller manufacturing method according to claim 1, wherein
the tip-end part of the linear electrode is formed into a prism shape.

* * * * *